United States Patent
Mintie et al.

(10) Patent No.: US 9,486,985 B2
(45) Date of Patent: Nov. 8, 2016

(54) SYSTEM AND METHOD FOR SEALING VENTS

(71) Applicant: MINTIE TECHNOLOGIES, INC., Los Angeles, CA (US)

(72) Inventors: James M. Mintie, Long Beach, CA (US); Jose Guadalupe Munoz, Valinda, CA (US); Christopher Foltz, Simi Valley, CA (US)

(73) Assignee: Mintie Technologies, Inc., Los Angeles, CA (US)

( * ) Notice: Subject to any disclaimer, the term of this patent is extended or adjusted under 35 U.S.C. 154(b) by 721 days.

(21) Appl. No.: 13/744,328

(22) Filed: Jan. 17, 2013

(65) Prior Publication Data

US 2013/0180649 A1    Jul. 18, 2013

Related U.S. Application Data

(60) Provisional application No. 61/587,590, filed on Jan. 17, 2012, provisional application No. 61/590,672, filed on Jan. 25, 2012.

(51) Int. Cl.
*B44C 7/00* (2006.01)
*B29C 65/00* (2006.01)
(Continued)

(52) U.S. Cl.
CPC .............. *B32B 27/12* (2013.01); *B05C 17/02* (2013.01); *B08B 15/00* (2013.01); *B32B 3/266* (2013.01);
(Continued)

(58) Field of Classification Search
CPC ........ F24F 13/08; F24F 13/20; F24F 13/082; B05C 17/0217; B05C 17/02; B05C 17/022; B65H 37/005; B65H 37/02; B65H 35/0033; B65H 9/02; B65H 9/08; Y10T 156/1705; B08B 17/06; B01D 46/10; B32B 27/08; B32B 27/12; B32B 3/266; B32B 3/16; B32B 5/028; B32B 37/0053; B32B 37/12; B32B 2307/51; C09J 7/0207; C09J 7/0232; C09J 7/0264
See application file for complete search history.

(56) References Cited

U.S. PATENT DOCUMENTS 701,727 A * 6/1902 Holmes ................ B65H 37/007
156/577
2,702,917 A * 3/1955 Lynden ............... B05C 17/0217
15/145

(Continued)

FOREIGN PATENT DOCUMENTS

CN      201864398 U    6/2011
DE      22 32 687 B1   8/1973
(Continued)

OTHER PUBLICATIONS

Invitation to Pay Additional Fees and Communication Relating to the Results of the Partial International Search mailed on Nov. 4, 2013, for International Application No. PCT/US2013/021988, filed on Jan. 17, 2013.

(Continued)

*Primary Examiner* — Alex Efta
(74) *Attorney, Agent, or Firm* — Lewis Roca Rothgerber Christie, LLP

(57) ABSTRACT

A method for sealing a vent includes coupling a film including an adhesive surface to an applicator, applying the film onto the vent using the applicator adhering the adhesive surface to at least one of the vent and a portion of a structure surrounding the vent, and decoupling the film from the applicator during or after the applying the film. An applicator for applying a sealing film to a vent for sealing the vent includes a first elongate member, a second elongate member having a bore extending along its length and receiving the first member within the bore, where the first elongate member is longer than the second elongate member and where a first end portion of the first elongate member extends beyond a first end of the second elongate member and a second end portion of the first elongate member extends beyond a second end of the first elongate member, and where the second elongate member is rotatable to various orientations relative to the first elongate member about a longitudinal axis.

17 Claims, 9 Drawing Sheets

(51) Int. Cl.
- *B32B 37/00* (2006.01)
- *B32B 27/12* (2006.01)
- *B32B 37/12* (2006.01)
- *B05C 17/02* (2006.01)
- *C09J 7/04* (2006.01)
- *F24F 13/08* (2006.01)
- *F24F 13/20* (2006.01)
- *C09J 7/02* (2006.01)
- *B65H 37/00* (2006.01)
- *B65H 37/02* (2006.01)
- *B65H 9/02* (2006.01)
- *B65H 9/08* (2006.01)
- *B08B 15/00* (2006.01)
- *B32B 3/26* (2006.01)
- *B32B 5/02* (2006.01)
- *B32B 37/10* (2006.01)
- *B32B 27/08* (2006.01)

(52) U.S. Cl.
CPC .............. *B32B 5/028* (2013.01); *B32B 37/12* (2013.01); *B65H 9/02* (2013.01); *B65H 9/08* (2013.01); *B65H 37/005* (2013.01); *B65H 37/02* (2013.01); *C09J 7/0207* (2013.01); *C09J 7/0264* (2013.01); *C09J 7/0296* (2013.01); *C09J 7/04* (2013.01); *F24F 13/08* (2013.01); *F24F 13/082* (2013.01); *F24F 13/20* (2013.01); *B32B 27/08* (2013.01); *B32B 37/0053* (2013.01); *B32B 2037/109* (2013.01); *B32B 2255/10* (2013.01); *B32B 2307/51* (2013.01); *B32B 2581/00* (2013.01); *C09J 7/0232* (2013.01); *C09J 2400/226* (2013.01); *C09J 2400/263* (2013.01); *Y10T 428/1471* (2015.01)

(56) References Cited

U.S. PATENT DOCUMENTS

| | | | |
|---|---|---|---|
| 2,984,853 A | 5/1961 | Williams | |
| 4,868,946 A * | 9/1989 | Marino | B05C 17/0217 15/230.11 |
| 5,090,084 A | 2/1992 | De Guzman | |
| 5,182,840 A * | 2/1993 | Jacobs | A46B 13/006 118/600 |
| 5,921,905 A * | 7/1999 | Newman, Jr. | B05C 17/0217 492/13 |
| 6,519,800 B2 * | 2/2003 | Newman | B05C 17/0217 15/152 |
| 6,776,208 B1 * | 8/2004 | Flynn | B65C 9/265 156/391 |
| 6,827,117 B1 * | 12/2004 | Shinozaki | B62D 65/06 156/391 |
| 7,043,793 B2 * | 5/2006 | Lu | B05C 17/0217 15/230.11 |
| 7,556,560 B2 | 7/2009 | Janesky | |
| 7,657,959 B2 | 2/2010 | Smith et al. | |
| 7,784,142 B2 * | 8/2010 | Scott, Sr. | B05C 17/0217 15/230.11 |
| 7,818,941 B2 | 10/2010 | Freudenberg et al. | |
| 2003/0232167 A1 * | 12/2003 | Wimmershoff | B65C 9/265 428/42.1 |
| 2006/0123741 A1 | 6/2006 | Wilson et al. | |
| 2007/0179034 A1 * | 8/2007 | Loyd | G05B 15/02 492/13 |
| 2009/0145557 A1 * | 6/2009 | Graham, Sr. | B25F 1/00 156/510 |
| 2010/0003913 A1 | 1/2010 | Sanchez | |
| 2011/0146162 A1 | 6/2011 | Kilhams | |

FOREIGN PATENT DOCUMENTS

| | | |
|---|---|---|
| EP | 1 443 158 A1 | 8/2004 |
| GB | 2 170 341 A | 7/1986 |
| JP | 8-154504 A | 6/1996 |
| JP | 2003-210290 A | 7/2003 |
| LU | 68 806 A1 | 1/1974 |
| WO | WO 01/56777 A1 | 8/2001 |

OTHER PUBLICATIONS

The International Search Report and The Written Opinion of the International Searching Authority mailed on Jan. 31, 2014, for International Application No. PCT/US2013/021988, filed on Jan. 17, 2013; 20 Pages.

* cited by examiner

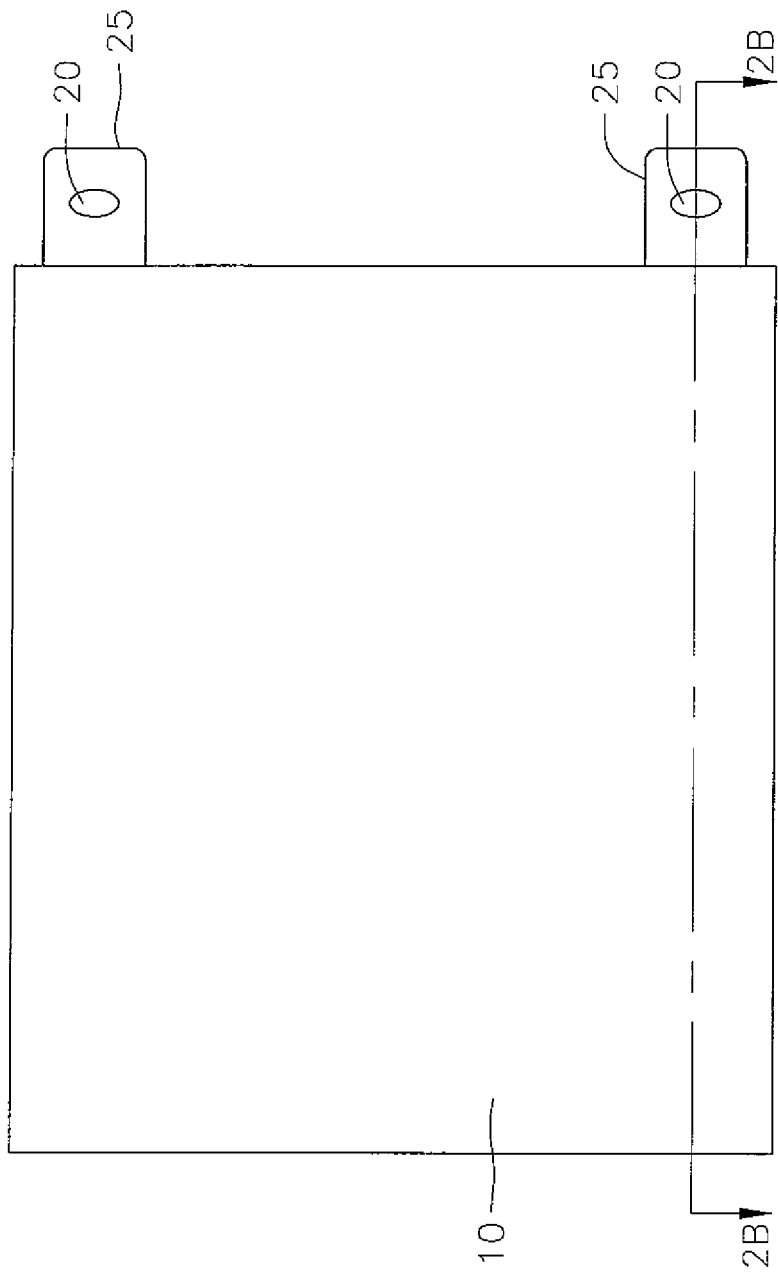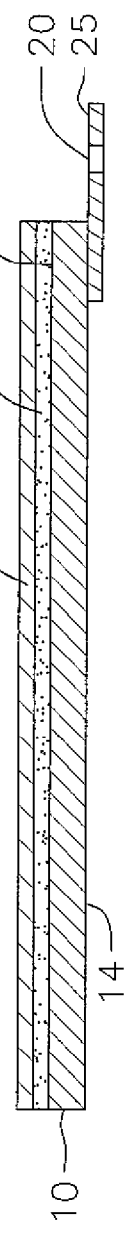
FIG.1B
FIG.2B

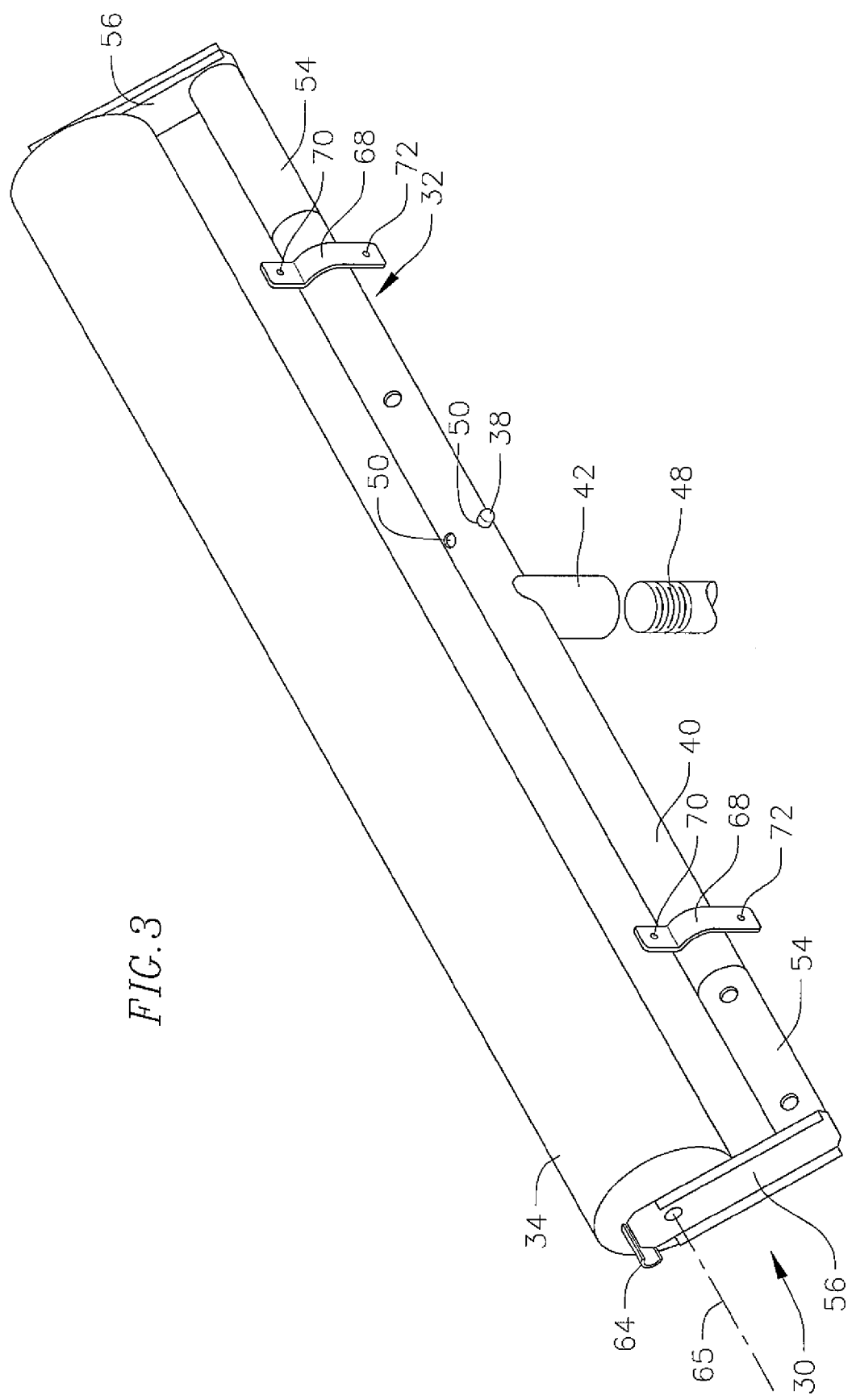

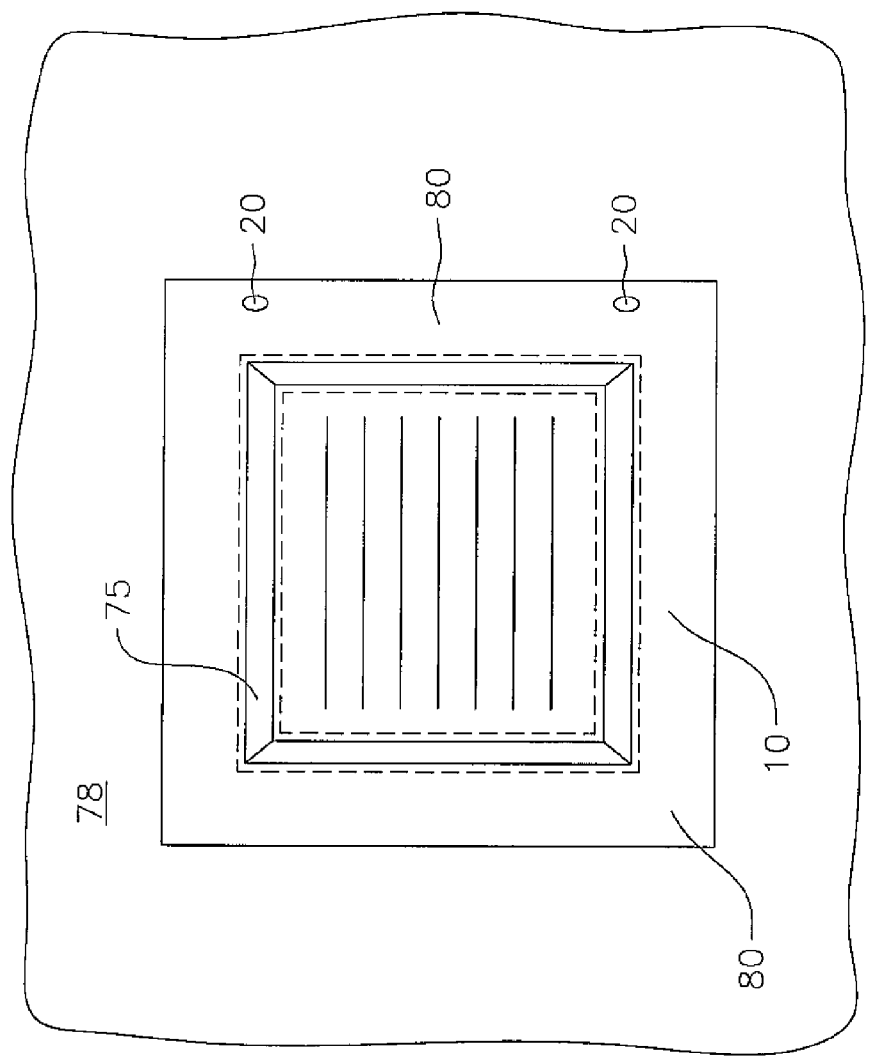

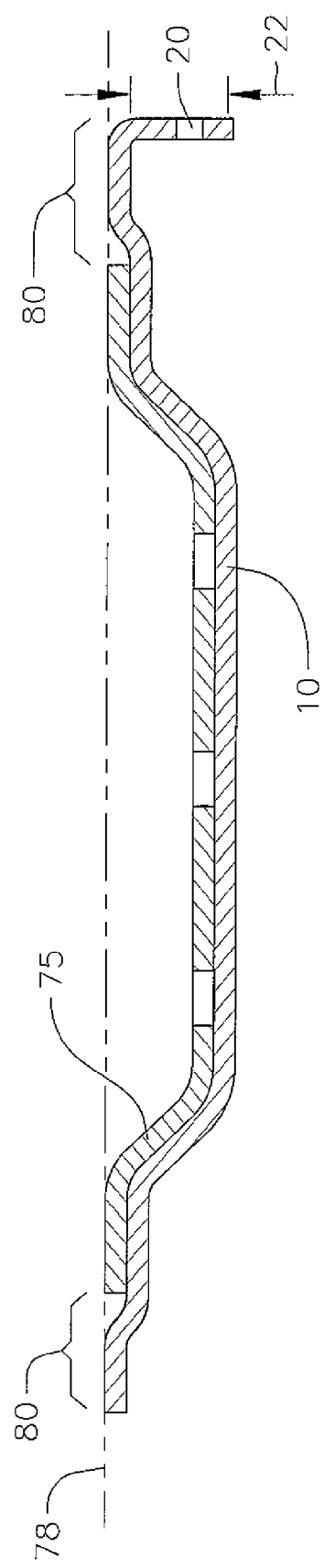

SYSTEM AND METHOD FOR SEALING VENTS

CROSS-REFERENCE TO RELATED APPLICATIONS

This application is based upon and claims priority on U.S. Provisional Application No. 61/590,672, filed on Jan. 25, 2012, entitled "System and Method for Sealing Vents" to inventors James M. Mintie, Jose Guadalupe Munoz, and Christopher Foltz, and on U.S. Provisional Application No. 61/587,590, filed on Jan. 17, 2012, entitled "System and Method for Sealing Vents" to inventors James M. Mintie, Jose Guadalupe Munoz, and Christopher Foltz, the contents of both of which are incorporated herein by reference in their entirety.

BACKGROUND OF THE INVENTION

When rooms, such as for example hospital rooms, have to be decontaminated, as for example by using hydrogen peroxide, all the vents in such rooms need to be sealed off. Currently, this is accomplished by using tape over the vents. More specifically, strips of tape are placed over the vent one at a time in an overlapping fashion until the entire vent is completely sealed. This practice takes time. In addition, a ladder may have to be incorporated in order for the tape to be applied to vents on the ceiling. If a ladder has to be used in a room, such as a hospital room, the ladder must also be OSHA approved. Thus, a system that allows for easier sealing of vents in such environment is desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an example embodiment, a method of sealing a vent is provided. The method includes coupling a film including an adhesive surface to an applicator, applying the film onto the vent using the applicator adhering the adhesive surface to at least one of the vent and a portion of a structure surrounding the vent, and decoupling the film from the applicator during or after the applying the film. In another example embodiment, the film includes at least on opening for receiving a prong extending from the applicator, and coupling the film to the applicator includes penetrating the opening with the prong. In yet a further example embodiment, decoupling includes withdrawing the prong from the opening. In one example embodiment, the method further includes removing the film from the at least one of the vent and the portion of a structure surrounding the vent using the applicator. In another example embodiment, removing includes engaging the opening with a projection extending from the applicator and pulling the film using the projection. In a further example embodiment, the applicator includes a roller and applying the film includes rolling the roller over the film over the vent. In yet a further example embodiment, the roller rolls about a first rolling axis, and the applicator includes a handle, the handle being adjustable about a second axis parallel to the rolling axis. In another example embodiment, the handle extends generally perpendicularly relative to the rolling axis and is coupled to the prong, and the method further includes orienting the handle to a position for orienting the prong in a direction away from a direction that the applicator is moved during the applying the film. In yet another example embodiment, the prong is a first prong defined by a tab on the applicator, and the tab defines a second prong opposite the first prong. In one example embodiment, coupling the film includes placing the film over the applicator. In another example embodiment, the applicator is a squeegee. In yet another example embodiment, the applicator includes a flat surface.

In another example embodiment, an applicator for applying a sealing film to a vent for sealing the vent is provided. The applicator includes a first elongate member, a second elongate member having a bore extending along its length and receiving the first member within the bore, where the first elongate member is longer than the second elongate member and where a first end portion of the first elongate member extends beyond a first end of the second elongate member and a second end portion of the first elongate member extends beyond a second end of the first elongate member, and where the second elongate member is rotatable to various orientations relative to the first elongate member about a longitudinal axis. The applicator also includes a handle coupled to the second elongate member, a first roller support fixed and extending from the first end portion, a second roller support fixed and extending from the second end portion, a roller coupled to the first and second roller supports and between the first and second roller supports, and a tab on the second elongate member defining a prong extending from the second elongate member. In another example embodiment, the applicator also includes a first end cap fixedly mounted to the first end portion, and a second end cap fixedly mounted to the second end portion, where the first roller support is fixed to the first end cap and the second roller support is fixed to the second end cap. In yet another example embodiment, the applicator further includes locking means for locking the second elongate member relative to the first elongate member at a desired orientation. In one example embodiment, the locking means includes a spring loaded push button on the first elongate member and a plurality of openings circumferentially around the second elongate annular member for receiving the spring loaded push button for locking the second elongate member at a desired orientation relative to the first elongate member. In a further example embodiment, the handle is generally perpendicular to the second elongate member. In one example embodiment, the handle is adjustable in length. In another example embodiment, the prong is a first prong and the tab defines a second prong extending from the second elongate member in a direction opposite the first prong. In yet another example embodiment, the applicator further includes a second tab on the second elongate member, the second tab defining a prong extending from the second elongate member. In one example embodiment, the prong defined on the second tab is a third prong and the second tab defines a fourth prong extending from the second elongate member in a direction opposite the third prong. In a further example embodiment, the applicator further includes a projection extending from at least one of the first and second roller supports in a direction away from the roller. In yet a further example embodiment, the projection is a hook.

In another exemplary embodiment a film for sealing vents is provided. The film includes a flexible polymeric layer comprising at least two spaced apart openings, a scrim layer reinforcing the openings, an adhesive on the flexible polymeric layer, and a protective layer removably adhered to the adhesive. In yet another exemplary embodiment, the flexible polymeric layer includes a length including a first portion and a second portion, and the adhesive is on the flexible polymeric film only along the first portion of the length and the scrim layer is reinforcing at least a portion of the film along the second portion of the length and does not extend to the first portion of the length.

BRIEF DESCRIPTION OF THE DRAWINGS

FIG. 1B is a plan view of another example embodiment film incorporated in the present disclosure.

FIG. 2B is a cross-sectional view of the film shown in FIG. 1B taken along arrows 2B-2B.

FIG. 3 is a perspective view of an example embodiment roller applicator of the present disclosure.

FIG. 7 is a plan view of a film of the present disclosure sealing a vent.

FIG. 8 is an end view of the film sealing a vent shown in FIG. 7.

It should be noted that the drawings are provided for illustrative purposes and may not be to appropriate scale.

DETAILED DESCRIPTION

Figure 1A:
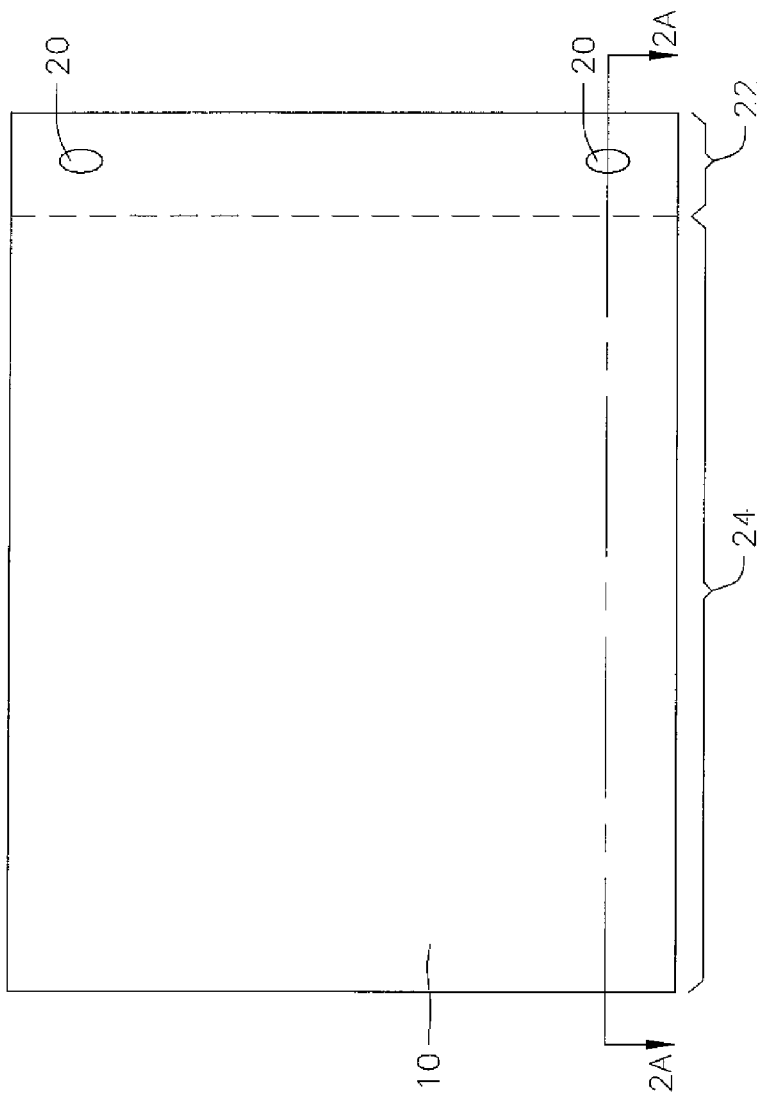
FIG. 1A is a plan view of an example embodiment film incorporated in the present disclosure.
Figure 2A:
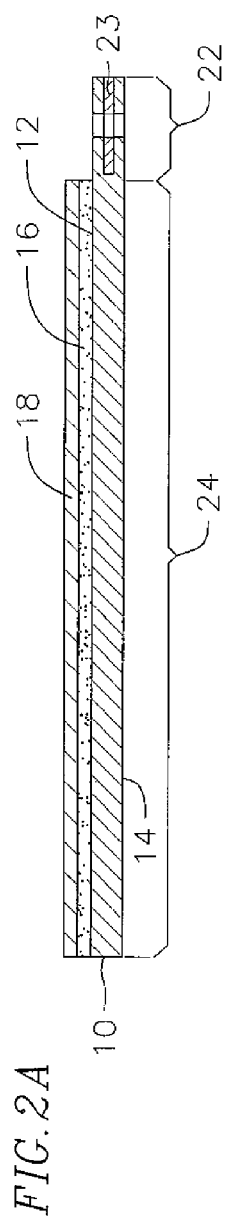
FIG. 2A is a cross-sectional view of the film shown in FIG. 1A taken along arrows 2A-2A.

In an example embodiment, a system is provided for sealing vents. A system includes a sealing film 10, as for example shown in FIGS. 1A and 1B. The film may be pre-cut in different geometrical shapes, as for example, square or rectangular shapes depending on the geometry of the vent to be sealed. The film may also have other shapes. The film has a first surface 12, opposite a second surface 14, that may be naturally adhesive or may have an adhesive 16 applied to it, as for example shown in FIGS. 2A and 2B. An example film is flexible polymeric film or plastic sheeting having a pressure sensitive adhesive on one of its surfaces. The film may be formed from a single layer of material or from multiple layers. Such multiple layers may be bonded to each other by known processes such as co-extruded. The adhesive may also be a separate layer of the film. In such case, the adhesive layer and the other layer(s) forming the film may be co-extruded. An example adhesive is a removable pressure sensitive adhesive. A removable pressure sensitive adhesive as used herein is one that is normally tacky at room temperature, adheres to a surface when applied with pressure, preferably light pressure, and is at least substantially removable without leaving adhesive residue to the surface. An example adhesive has sufficient shear and peel strength to hold the film attached to the object to be sealed until it is removed. An example film has a thickness of 4 mils. Another example film has a thickness of 2 mils. Other thickness films may also be used. Example films (also referred to as "sheets") are disclosed in U.S. Pat. No. 7,818,941, issued Oct. 26, 2010, the contents of which are fully incorporated herein by reference. For protective purposes, a removable protective sheet 18, such as a removable paper is temporarily adhered to the adhesive surface. In an example embodiment, two openings 20 are formed through the film proximate one end of the film, as for example shown in FIGS. 1A and 2A. In an example embodiment, if an adhesive is used, the adhesive may not be applied to an end portion 22 of the film incorporating the openings 20. In such an embodiment, the protective sheet 18 may be limited to cover only the portion 24 of the first surface incorporating the adhesive. In an example embodiment, the portion 22 including the openings 20 may reinforced with scrim 23, such as polyester reinforced scrim. In one example the portion 22 is laminated to include at least one layer of scrim. The scrim reinforces the openings 20 such that they are more resistant to tearing when they are penetrated by an applicator prong such as prong 72 described below. In another embodiment, the scrim reinforcement may be limited only to the area surrounding each of the openings 22 and does not extend along the entire portion 22 of the film. In another example embodiment, instead of being formed on the film itself, the openings 22 are formed on tabs 25 extending from the film 10, as for example shown in FIGS. 1B and 2B. The tabs 25 may be integrally formed with the film 10 or may be attached to the film 10. They may be attached to either surface of the film 10. In one example embodiment, the tabs may also be reinforced with scrim.

Figure 4:
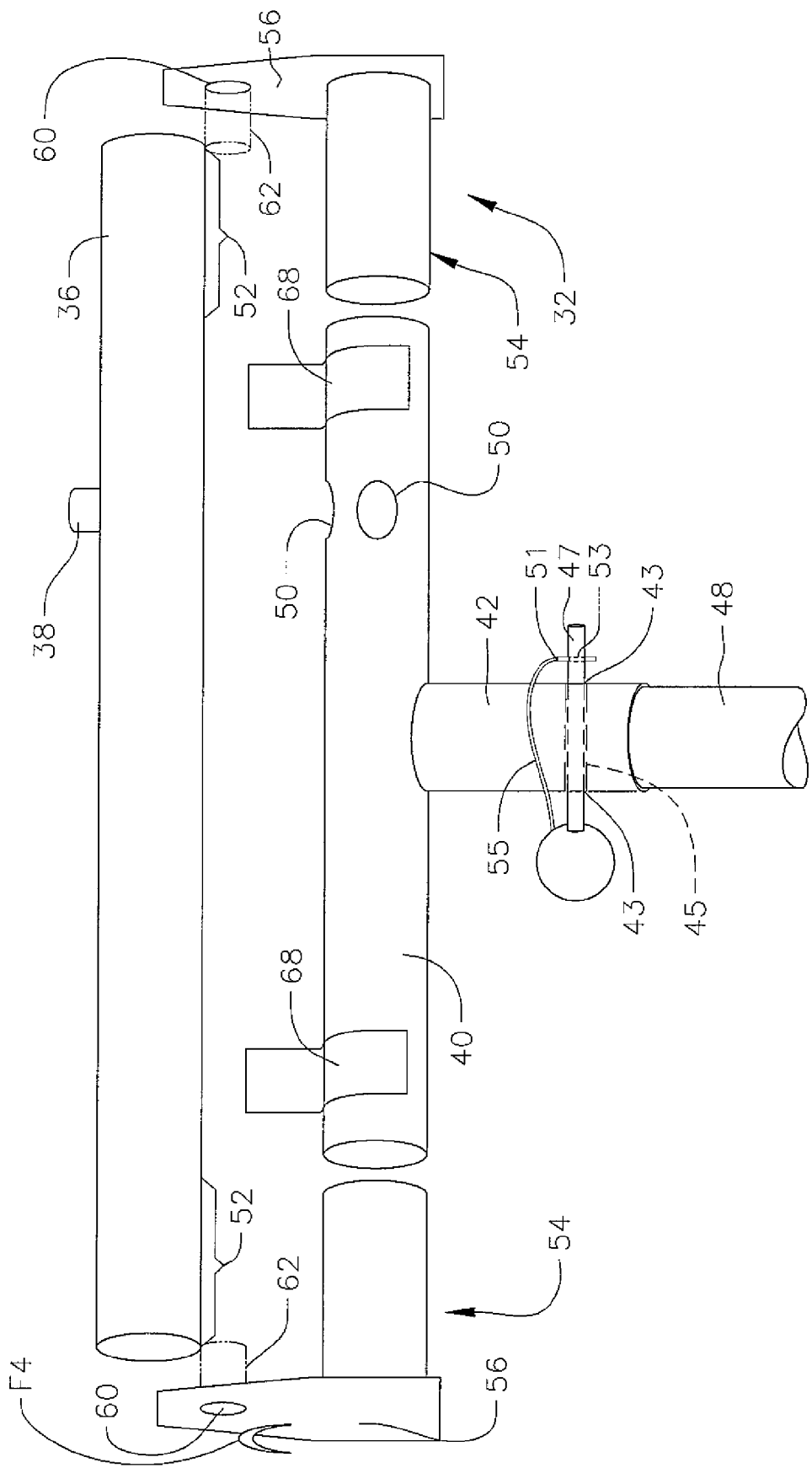
FIG. 4 is an exploded view of the roller applicator supporting structure of the present disclosure.

To apply the film to a vent, a roller applicator 30 is used, as for example shown in FIG. 3. The applicator includes a supporting structure 32 onto which a roller 34 is mounted. An example embodiment roller has a foam outer surface made from a material such as high density foam, as for example neoprene or urethane. The supporting structure includes a first or inner tubular member 36 onto which is mounted a spring-loaded push button 38, as for example shown in FIGS. 3 and 4. The inner tubular member is fitted within a second or outer tubular member 40. The outer tubular member includes a structure 42 for receiving a handle. The structure 42 may be a tubular member as shown in FIGS. 3 and 4 attached to, or integrally formed with, the outer tubular member, or may be any other structure, as for example, a threaded opening in the outer tubular member onto which the handle may be threaded. In an example embodiment, a handle 48 is threaded to inner threads (not shown) in the tubular member 42. In another example embodiment, instead of threading, or in addition to threading, the handle and tubular member may include openings which align to receive a lock pin. For example, as shown in FIG. 4, the tubular member may have opposite openings 43 which align with an opening or bore 45 formed through the handle 48. A pin 47 penetrates the aligned openings 43 and bore 45 to retain the handle attached to the tubular member and for preventing the handle from rotating a substantive amount, or at all, relative to the tubular member. The pin 47 may include a first stop member 49 that attaches proximate a first end of the pin, such as for example a ring, and second stop member 51 that attaches proximate a second opposite end of the pin for preventing an unwanted withdrawal of the pin from the openings 43 and bore 45. The second stop member may be a lock pin that is received through a bore 53 formed through the pin or may be a clip that otherwise attached to the second end of the pin. The first and second stop members may be connected to each other.

In an example embodiment, the outer tubular member 40 is shorter in length than the inner tubular member. The outer tubular member 40 also includes at least two openings 50 for receiving the spring loaded push button 38. The inner tubular member is inserted into the outer tubular member such that the spring loaded push button penetrates one of the openings 50. When in that position, end portions 52 of the inner tubular member extend beyond either end of the outer tubular member. End caps 54 are fitted over the end portions 52 and are fixed to such end portions. The end caps may be fixed to the end portions 52 using well-known methods, as for example by using adhesives or by welding. A roller supporting member 56 extends from each of the end caps. In an example embodiment, the rolling supporting members are welded, adhered to, or otherwise fixed to the end caps. In another example embodiment, the inner tubular member may not be longer than the outer tubular member. In an example embodiment, the inner tubular member may have the same length or may be shorter than the outer tubular member. In such embodiment, the end caps and/or roller supporting structures are connected to inner surfaces or ends of the inner tubular member. In an example embodiment, the roller supporting member may be formed integrally with the end caps. The roller supporting members may have openings 60 (FIG. 4) or pins 62 (shown in dashed lines in FIG. 4) allowing for coupling with the roller 34. In other example embodiments, the roller supporting members may be fixed directly to the end portion 52 without requiring any end caps.

Figure 5:
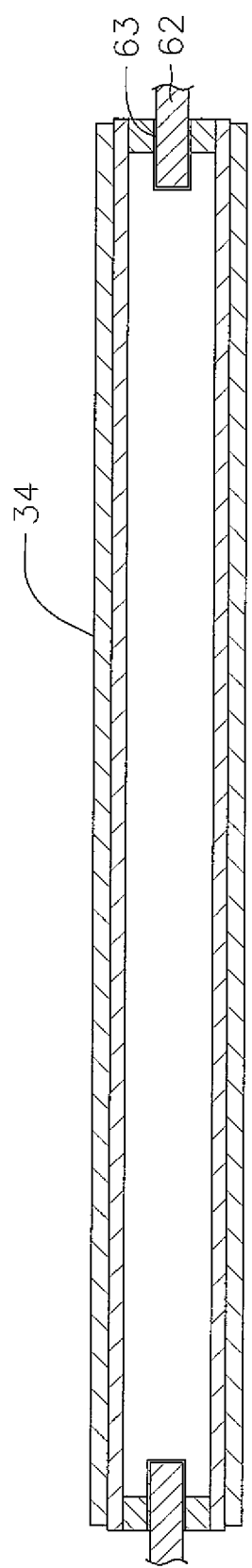
FIG. 5 is a cross-sectional view of an example embodiment roller incorporated in a roller applicator of the present disclosure.

In an example embodiment, the roller 34 is placed between roller supporting structures and rotatably fastened to each roller supporting structure using fasteners through the openings 60 formed in the roller supporting structures. In an example embodiment where the roller supporting structures include pins 62, such pins are received in complementary openings 63 formed through the roller ends, as for example shown in FIG. 5. The coupling of the pins or fasteners with the roller is such that the roller can, rotate about its longitudinal axis 65 relative to the supporting structure. In one example embodiment, the supporting structures are flexible. In such case, at least one of the roller supporting structures is flexed allowing the roller to be placed between the roller supporting structures such that the pin 62 of one of the roller supporting structures (preferably the roller supporting structure that is not flexed) penetrates the opening 63 at the end of the roller. The flexed roller supporting structure is then allowed to flex back to its original position and its pin 62 penetrates its corresponding opening 63 formed through the roller end.

In an example embodiment, a projection or hook 64 is attached to, or is integrally formed with, at least one of the roller supporting structures and extends opposite the roller.

Two tabs 68 are connected to the outer tubular member 40. Each tab is connected proximate an end of the outer tubular member. The tab is attached to the outer tubular member such that it has a first prong 70 extending in one direction from the tubular member and a second prong 72 extending in opposite direction from the first prong. In an example embodiment, each tab may be integrally formed with the tube. In another example embodiment, the tab defines a single prong, or more than two prongs.

The handle 48 which, in an example embodiment, is an adjustable handle that could be adjusted to different lengths, is connected to the outer tubular member. The handle with the outer tubular member 40 may be rotated relative to the inner tubular member and the attached end caps (where used) by pressing on the spring-loaded button enough so that it can disengage from the opening 50 that it is penetrating allowing the outer tubular member to rotate relative to the inner tubular member until the spring loaded button penetrates another opening 50 formed on the outer tubular member.

The openings 50 are oriented as such that the handle and the outer tubular member may be rotated relative to the inner tubular member and locked into place by the spring-loaded button penetrating through an opening 50 in the outer tubular member such that one of the prongs 70, 72 extending beyond the outer tubular member extend in a direction opposite from the direction of movement of the roller applicator when applying the film to a vent. Such prongs do not necessarily have to be parallel to such direction.

Figure 6:
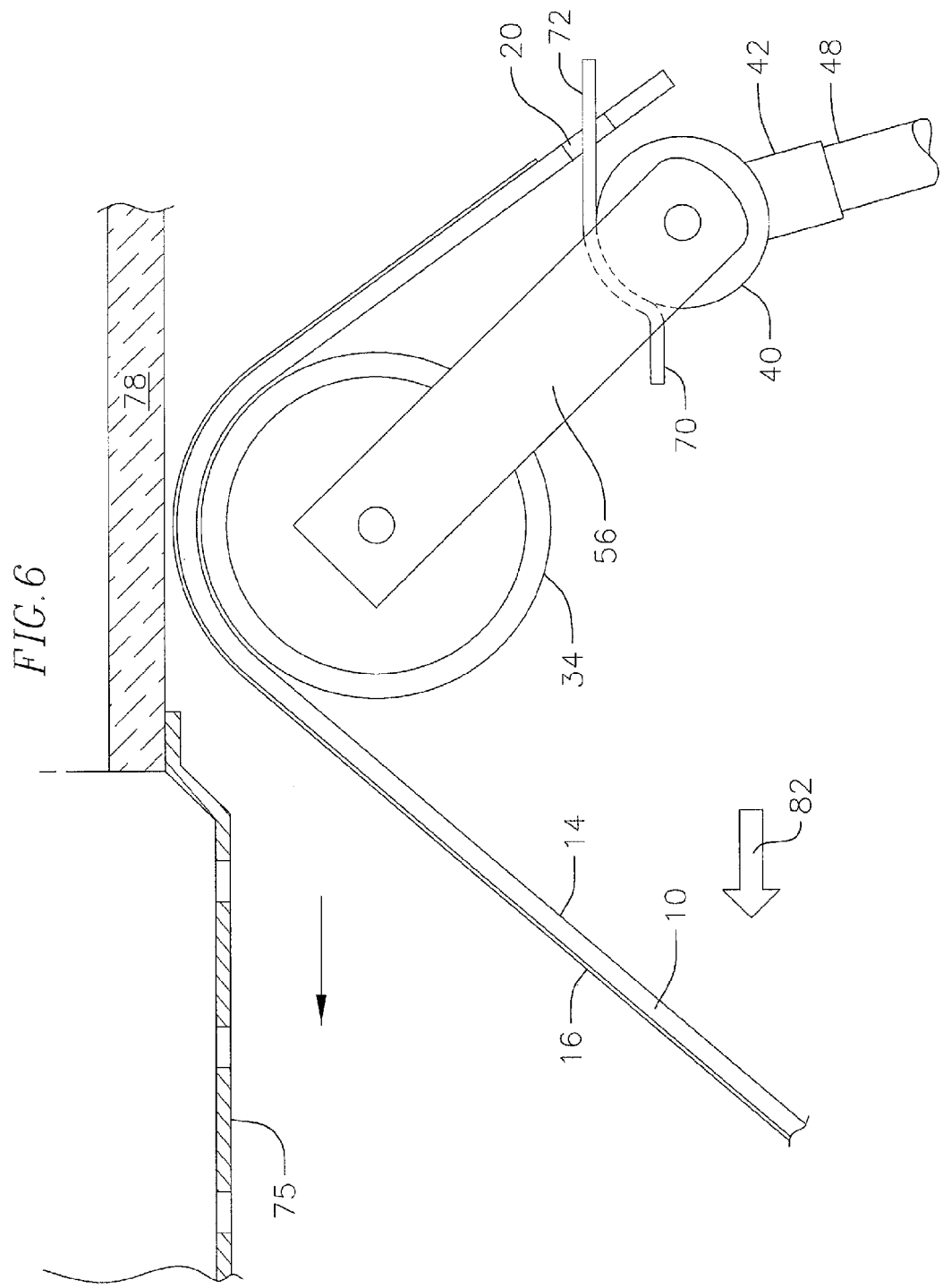
FIG. 6 is an end view of a roller applicator of the present disclosure being used to seal a vent.

In an example embodiment, a roller system is used to apply the film 10 to a ceiling vent 75 extending from a ceiling 78, as for example shown in FIG. 6. The handle 48 and the outer tubular member 40 are positioned relative to the inner tubular member in a position shown in FIGS. 3 and 6 and locked in place by having the spring loaded button 38 penetrates an appropriate opening 50 as shown in FIG. 3. The openings 20 of the film (or film tabs) are placed such that the projecting prongs 72 penetrate such openings and the film 10 is draped over the roller 34 such that the protective sheet covering the film is opposite the roller, as shown in FIG. 6. In other words, the film second surface 14 which is not covered by the protective sheet extends over the roller. The protective sheet is peeled from the film to reveal the adhesive surface 16. The roller system with the film hooked by the prongs and draped over the roller is position adjacent to the vent 75, as for example shown in FIG. 6. The roller is then rolled over the ceiling portion adjacent the vent and over the vent such that it puts pressure on the film causing the film to adhere to the vent and to the ceiling portion 80 surrounding the vent, as for example shown in FIGS. 7 and 8. As the roller applicator 30 is moved in a direction along arrow 82 (FIG. 6), the roller 34 rolls over the film 10 causing the film to adhere to the vent and/or the ceiling portion surrounding the vent, the prongs 72 withdraw from the openings 20, thereby releasing the film from the roller applicator 30. Once the film is disengaged from the roller applicator, the applicator may be pressed over the film by rolling along different directions to ensure that the film has adhered to the vent and/or to the ceiling surrounding the vent. In the embodiments where the adhesive does not extend to the end portion 22 of the film with the openings, such end portion will droop away from the ceiling, as for example shown in FIG. 8.

Figure 9A:
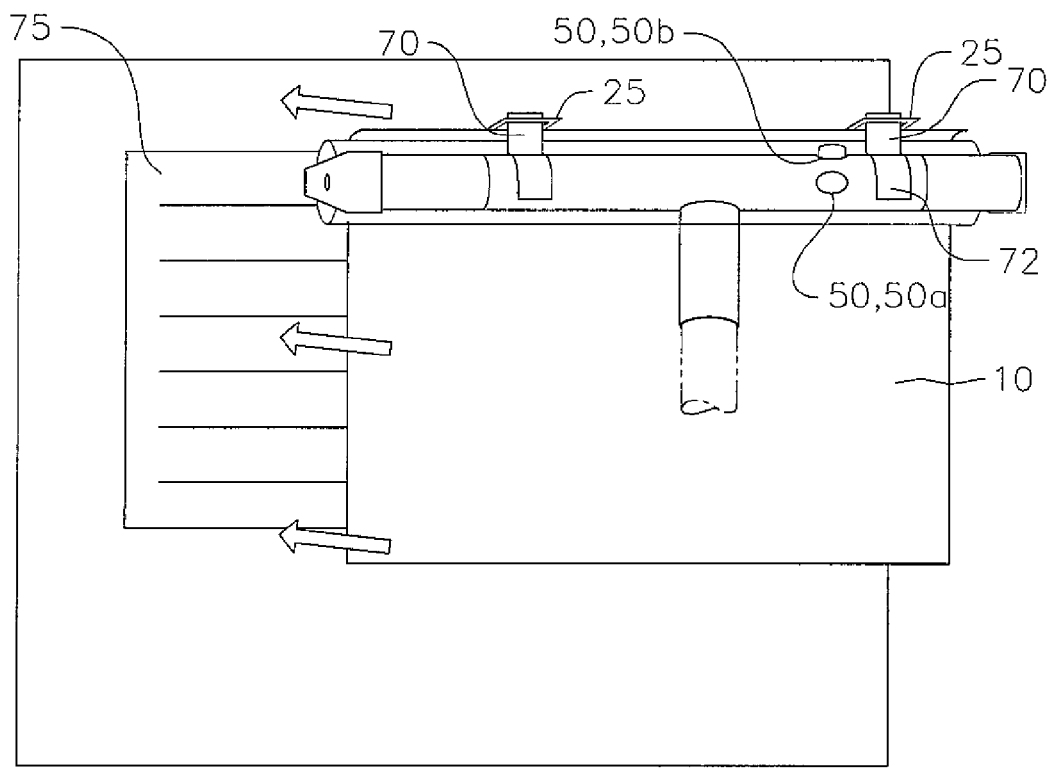
FIGS. 9A and 9B depict a roller applicator of the present disclosure being used to seal a vent mounted on a vertical wall.
Figure 9B:
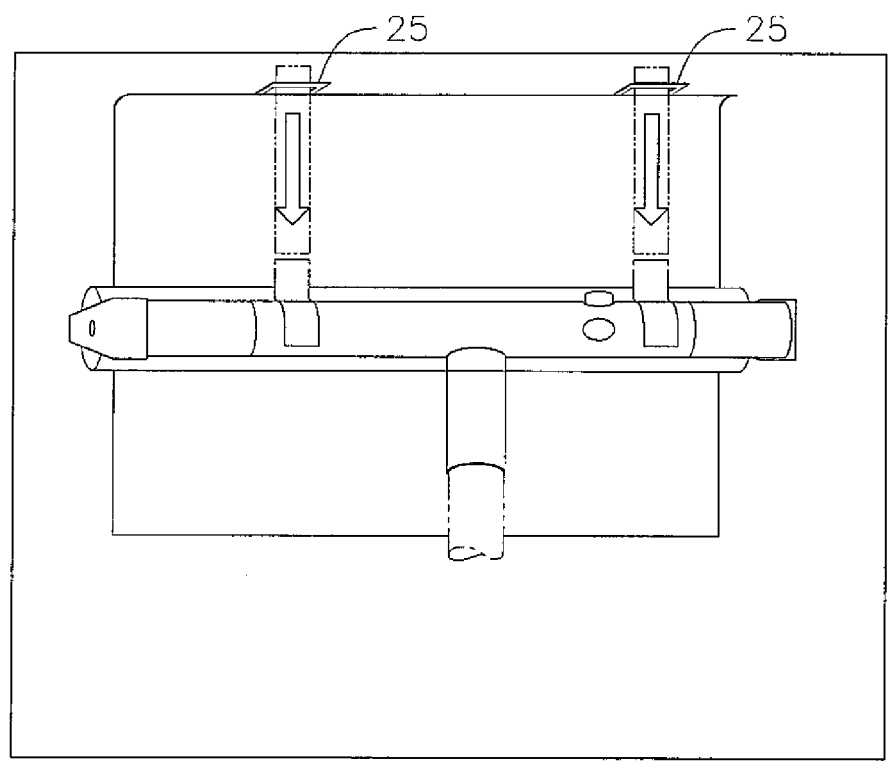

If the vent to be sealed is located on a vertical wall (FIGS. 9A and 9B), the outer tubular member along with handle is rotated to another position. This is done by pressing the spring loaded button to disengage from opening 50 (also denoted as 50*a* in FIG. 9A) and then rotating the outer tubular member with the handle until it engages another opening 50 (also denoted as 50*b* in FIG. 9A) so that one of the prongs of each tab, as for example prong 70 is opposite the direction in which the roller application will be moved for applying the sealing film, as shown sequentially in FIGS. 9A and 9B, respectively. The outer tubular member may be provided with multiple openings 50 (i.e., two or more openings) circumferentially around it for being engaged by with the spring loaded button at different orientations of the outer tubular member relative to the inner tubular member. In addition, by having two opposite prongs extending from each tab, it is ensured that at least one of the prongs will be pointing generally opposite from the direction of movement of the roller applicator during the application process. After decontamination of the room, the film may easily be removed by penetrating one of the openings 20 with the hook 64 of the roller application and pulling on it. This is made easier if the portion 22 of the film is not adhered to the ceiling and is drooping away from the ceiling. The applicator of the present disclosure may also be used to apply the sealing film to vents in other structures or walls, not just in ceilings and vertical walls. In addition, such tabs may define prongs in extending in all different directions so as to allow for easier sealing of vents located in surfaces that are not vertical or horizontal, as for example vents in surfaces that are oblique.

In another example embodiment, the film may be provided on a roll. In such an embodiment, the film may not require a protective sheet 18 as the film is rolled on to itself much like a roll of adhesive tape such as Scotch tape. With this embodiment a desired amount of the sheet is unrolled from the roll and cut to separate from the roll and positioned over a vent. In another embodiment, the sheets on a roll may be pre-cut to desired lengths or may be weakened at desired length intervals such that pulling the sheet off the roll will cause the sheet to break off the roll at the desired length (similar to paper towels or on a roll). A roller applicator, such as the roller applicator described herein, may be used to apply pressure against the film for adhering it to the vent. In another embodiment, the cut sheet is draped over the roller application and the roller applicator is used to apply the film over a vent. In another embodiment, instead of a roller applicator, an applicator with a flat surface may be used. In such case, the flat surface may be used to apply pressure against the film for sealing the vent. In yet a further embodiment, a roll of film, as for example described above, is mounted on a handle, for example like a paint roller is mounted on a handle. With this embodiment, the roll of film is rolled over the vent using the handle, and the film attaches to a portion of the vent and/or the structure surrounding the vent, causing the film to unroll as the roll is moved across the vent and/or structure and the film attaches to the remainder of such vent and/or structure. Once the right amount of film is attached to the vent and/or structure, the film is cut from the roll. In embodiments where the film is pre-cut or weakened at a section, only the pre-cut amount rolls off the roll, or tears from the roll at the weakened section by pulling on the roll, and attaches to the vent and/or structure.

As can be seen, the present system allows for the sealing of vents in ceilings, walls and other places easily without having to use strips of tape, which are cumbersome and time consuming, and without having to use other devices such as ladders.

Although the present invention has been described and illustrated in respect to example embodiments, it is to be understood that it is not to be so limited, since changes and modifications may be made therein which are within the full intended scope of this invention as hereinafter claimed. For example, the film may include a single opening 20 or more than two openings 20. Similarly the roller applicator may include a single tab 68 or multiple tabs. In other example embodiments, the applicator may be a squeegee or a flat piece of material, or a structure having a flat surface that can apply the film on the vent. The film may not have the openings 20. In another example embodiment, instead of using a spring loaded button 38 in combination with the openings 50, other mechanisms may be used that will allow for the different locked positions/orientations of the outer tubular member or handle in relation to the inner tubular member. For example, a ratchet may be used. In another example embodiment, the inner tubular member may have at least a portion which is solid and not annular. Accordingly, all such modifications are intended to be included within the scope of this disclosure as defined in the following claims. It is the express intention of the application not to invoke 35 U.S.C. §112, paragraph 6 for any limitations of any of the claims herein, except for those in which the claim expressly uses the words 'means for' together with an associated function.

What is claimed is:

1. A method of sealing a vent in a room comprising:
   coupling a film comprising an adhesive surface to a roller applicator, wherein the film comprises at least one opening for receiving a prong extending from the applicator, wherein coupling the film to the applicator comprises penetrating said opening with said prong; and
   applying the film onto the vent using said roller applicator by rolling said roller applicator over said film over said vent while withdrawing the prong from said opening adhering said adhesive surface to at least one of said vent and a portion of a structure of said room surrounding said vent.

2. The method as recited in claim 1, further comprising removing the film from said at least one of said vent and said portion of a structure surrounding said vent using said applicator.

3. The method as recited in claim 2, wherein removing comprises engaging said opening with a projection extending from the applicator and pulling said film using said projection.

4. The method as recited in claim 1, wherein said roller rolls about a first rolling axis, and wherein said applicator comprises a handle, said handle being adjustable about a second axis parallel to said rolling axis.

5. The method as recited in claim 4, wherein the handle extends substantially perpendicularly relative to said rolling axis and is coupled to said prong, the method further comprising orienting said handle to a position for orienting said prong in a direction away from a direction that said applicator is moved during said applying the film.

6. The method as recited in claim 1, wherein the prong is a first prong defined by a tab on said applicator, wherein said tab defines a second prong opposite the first prong.

7. The method as recited in claim 1, wherein coupling the film comprises placing the film over the applicator.

8. The method as recited in claim 1, wherein the applicator comprises a flat surface.

9. An applicator for applying a sealing film to a vent for sealing the vent, the applicator comprising:
   a first elongate member;
   a second elongate member having a bore extending along its length and receiving said first elongate member within the bore, wherein the first elongate member is longer than the second elongate member and wherein a first end portion of the first elongate member extends beyond a first end of the second elongate member and a second end portion of the first elongate member extends beyond a second end of the second elongate member, wherein the second elongate member is rotatable to various orientations relative to the first elongate member about a longitudinal axis;
   a handle coupled to the second elongate member;
   a first roller support fixed relative to the first elongate member and extending from the first end portion;
   a second roller support fixed relative to the first elongate member and extending from the second end portion;
   a roller coupled to said first and second roller supports and between said first and second roller supports; and a tab on said second elongate member defining a prong extending from said second elongate member.

10. The applicator as recited in claim 9, further comprising:
a first end cap fixedly mounted to the first end portion; and
a second end cap fixedly mounted to the second end portion, wherein the first roller support is fixed to the first end cap and the second roller support is fixed to the second end cap.

11. The applicator as recited in claim 9, further comprising locking means for locking said second elongate member relative to said first elongate member at a desired orientation, wherein said locking means comprises a spring loaded push button on said first elongate member and a plurality of openings circumferentially around said second elongate annular member for receiving said spring loaded push button for locking said second elongate member at a desired orientation relative to the first elongate member.

12. The applicator as recited in claim 9, wherein the handle is substantially perpendicular to the second elongate member.

13. The applicator as recited in 9, wherein said prong is a first prong and wherein the tab defines a second prong extending from the second elongate member in a direction opposite the first prong.

14. The applicator as recited in claim 9, further comprising a second tab on said second elongate member, said second tab defining another prong extending from said second elongate member.

15. The applicator as recited in claim 14, wherein said another prong defined on said second tab is a third prong and wherein the second tab defines a fourth prong extending from the second elongate member in a direction opposite the third prong.

16. The applicator as recited in claim 9, further comprising a projection extending from at least one of said first and second roller supports in a direction away from said roller.

17. The applicator as recited in claim 16, wherein the projection is a hook.

* * * * *